United States Patent [19]
Creemer

[11] Patent Number: 6,014,727
[45] Date of Patent: Jan. 11, 2000

[54] METHOD AND SYSTEM FOR BUFFERING MESSAGES IN AN EFFICIENT BUT LARGELY UNDIVIDED MANNER

[75] Inventor: David Z. Creemer, Palo Alto, Calif.

[73] Assignee: Apple Computer, Inc., Cupertino, Calif.

[21] Appl. No.: 08/780,051

[22] Filed: Dec. 23, 1996

[51] Int. Cl.[7] .................................................. G06F 13/00
[52] U.S. Cl. ........................ 711/118; 711/119; 711/129; 709/214; 709/215
[58] Field of Search ..................................... 711/173, 171, 711/118, 119, 129; 370/468; 340/825.07; 709/214, 215

[56] References Cited

U.S. PATENT DOCUMENTS

| | | | |
|---|---|---|---|
| 5,289,470 | 2/1994 | Chang et al. ............................ | 711/173 |
| 5,784,698 | 7/1998 | Brady et al. ............................. | 711/171 |
| 5,812,775 | 9/1998 | Van Seters et al. ................ | 395/200.43 |

*Primary Examiner*—Le Hien Luu
*Attorney, Agent, or Firm*—Beyer & Weaver, LLP

[57] ABSTRACT

The invention relates, in one embodiment, to a method in a computer network having a server computer coupled to a client computer for exchanging a message from the client computer to the server computer. The method includes receiving at the server computer a first data portion associated with the message from the client computer. The method further includes allocating a first memory space in a memory of the server computer for buffering the first data portion. If a second data portion associated with the message is received at the server computer from the client computer, the method also includes writing the first memory space to a nonvolatile memory of the server computer, thereby permitting the first memory space to be unallocated, and allocating a second memory space in the memory of the server computer for buffering the second data portion, the second memory space being larger than the first memory space.

15 Claims, 7 Drawing Sheets

METHOD AND SYSTEM FOR BUFFERING MESSAGES IN AN EFFICIENT BUT LARGELY UNDIVIDED MANNER

BACKGROUND OF THE INVENTION

The present invention relates to methods and apparatus for exchanging messages in a computer network. More particularly, the present invention relates to improved techniques for allocating memory in a server of a computer network to more efficiently service the communication needs of multiple network connections in the computer network.

Computers in a computer network oftentimes communicate with one another by exchanging messages. In a computer network architecture known as a client-server architecture, messages between two client computers are typically exchanged via a third computer known as a server computer. By way of example, FIG. 1 illustrates a typical computer network 200 representing, for example, a local area network (LAN). Computer network 200 typically includes two or more interconnected computers. In FIG. 1, computer network 200 includes computers 202, 204, 206, 208, and 210. Computer 202 may be designated a server for servicing the communication needs of its client computers 204, 206, 208, and 210. Each of client computers 204, 206, 208, and 210 may be coupled to server 202 via a network interface circuit 218 to allow the client computers to exchange messages via server 202.

Server 202 may also be coupled to other servers, e.g., server 212. Server 212 represents a server which may belong to another local area network and/or may be coupled to a larger computer network, e.g., the Internet 216. Via server 202 and 212, any of clients 204, 206, 208, and 210 may also communicate with a computer coupled to server 212, e.g., client computer 214 or a computer in the Internet 216. For example, client computer 204 may send a message to client computer 206 through server 202 along communication path 220. As a further example, client computer 214 may send a message to client computer 208 (through servers 212 and 202) via a communication path 222.

In servicing the communication needs of its client computers, server computer 202 has a fundamental limitation. Within server computer 202, there exists a finite memory resource. For example, although modem servers are typically endowed with a large amount of random access memory (RAM), this memory resource is not unlimited. This limited memory resource must be allocated among the multiple client computers, each of which needs a certain amount of memory buffer within server computer 202 to buffer the data it wishes to transmit to another client computer via server computer 202.

If too much buffer memory is allocated for each client, the finite memory space within server computer 202 can service only a few network connections, i.e., clients, at any given time. If a smaller amount of buffer memory is allocated for each client, a greater number of network connections may be served simultaneously. However, server computer 202 must frequently write the smaller buffer memory spaces to disk in order to satisfy the memory needs of each network connection. Writing to disk, which is a known technique for extending a small memory space to satisfy a larger memory requirement, is however slow. This is because disk-based memory has a slower access speed and is inherently slower in operation than semiconductor memory. Accordingly, performance may suffer as server computer 202 writes to disk often.

To further illustrate the foregoing, FIG. 2 shows a memory 300, representing the memory space within server computer 202. In the prior art, each network connection is allotted a fixed amount of buffer memory to service its data buffering needs within server computer 202. For discussion purposes, memory 300 is divided into nine buffer memory spaces 304, with each buffer memory space servicing a different network connection.

Data streams 308 and 307 represent the data streams associated with two different network connections, e.g., from the network connection between client 204 and server 206 of FIG. 1, and from the network connection between client 208 and server 214 respectively. As shown in FIG. 2, data stream 308 is allotted buffer memory space 304($a$) while data stream 307 is allotted buffer memory space 304($b$). If there are other network connections currently active, their data streams may be allotted other buffer memory spaces in memory 300, e.g., buffer memory spaces 304($c$)–304($i$).

If the size of the data stream is smaller than or equal to the size of the buffer memory space, that data stream can be buffered in its entirety within its allotted buffer memory space in memory 300, and there is no need to write to disk 310. This is illustrated in the case of data stream 307, wherein the actual data 307($a$) is smaller than the allotted buffer memory space 304($b$) and must, in some systems, be padded with data 307($b$) to facilitate storage within buffer memory space 304($b$).

If the data stream is larger than can be stored in its entirety within its allotted buffer memory space, however, it is typically divided in the prior art into multiple data portions. By way of example, data stream 308 is divided into multiple equal data portions 308($a$), 308($b$), 308($c$), 308($d$), and so on in FIG. 2. To facilitate data buffering within buffer memory space 304($a$), the size of each data portions 308($a$)–308($d$) typically is slightly smaller than or equal to the size of buffer memory space 304($a$).

For the larger data streams, each data portion of the data stream is, in a serial manner, first written to the buffer memory space allotted to that data stream, and then written to disk to allow the allotted buffer memory space to receive the next data portion. With reference to FIG. 2, for example, data portion 308($a$) of data stream 308 would be written to buffer memory space 304($a$) and then to disk 310 (via path 312) to enable buffer memory space 304($a$) to receive subsequent data portions of data stream 308, e.g., data portions 308($b$), 308($c$), 308($d$), and so on.

For ideal performance, each buffer memory space should be as large as possible. This is because the responsiveness of a network connection depends, in part, on the size of the buffer memory space allotted to it. As mentioned earlier, however, the buffer memory space allotted to each network connection cannot be infinite since the memory available within the server computer is a) of a finite size, and b) must be apportioned among many network connections. In the prior art, optimization typically involves balancing, among other issues, the size of the buffer memory space allotted to the network connections versus the number of network connections simultaneously served.

While the prior art data buffering scheme of FIG. 2 is workable, particularly when the size of the data portions (and corresponding buffer memory spaces) is carefully chosen, there are, however, disadvantages. The prior art requires that all data portions of a given data stream be equal in size. The prior art also statically assigns a buffer memory space to a data stream and requires this buffer memory space to service all the data buffering need of this network connection. Accordingly, the corresponding buffer memory space must at least equal or be larger in size than the size of the equal data portion in order to properly buffer it. It is discovered, however, that there is a fair amount of waste and inefficiency in the prior art's utilization of the server's memory space irrespective of the size of the buffer memory space chosen.

To illustrate, if the size of each buffer memory space 304 is small, a high number of writes may be needed for most messages, and connection responsiveness suffers. If the size of each buffer memory space 304 is large, only a few simultaneous connections may be served. Additionally, larger buffer memory spaces expose a greater portion of the data stream to risk of loss, e.g., from power failure, since more of the data stream is kept in volatile memory and few writes to the nonvolatile memory, e.g., disk, are performed.

Even if the size of each buffer memory space 304 is optimized for most messages (taking into account the tradeoff between responsiveness, data safety, and the desired number of simultaneous network connections), there is waste when the data stream happens to be much smaller than the allotted buffer memory space, which has been optimized for all data streams, large or small. This waste problem is particularly disadvantageous for certain type of data, such as electronic mails, wherein a significant percentage of the messages are fairly small and only a few messages are large but the buffer memory spaces in the server memory must be sized such that the larger messages do not unduly suffer in term of connection responsiveness.

In view of the foregoing, there are desired improved techniques for buffering data for multiple network connections within the memory of the server computer. The improved techniques preferably maximize the number of network connections served in the limited memory of the server computer while minimizing the delay associated with writing to disks, thereby improving the responsiveness of the network connections.

SUMMARY OF THE INVENTION

The invention relates, in one embodiment, to a method in a computer network having a server computer coupled to a client computer for exchanging a message from the client computer to the server computer. The method includes receiving at the server computer a first data portion associated with the message from the client computer. The method further includes allocating a first memory space in a memory of the server computer for buffering the first data portion. If a second data portion associated with the message is received at the server computer from the client computer, the method also includes writing the first memory space to a nonvolatile memory of the server computer, thereby permitting the first memory space to be unallocated, and allocating a second memory space in the memory of the server computer for buffering the second data portion, the second memory space being larger than the first memory space.

In another embodiment, the invention relates to a method, in a computer network having a server computer coupled to a client computer, for exchanging a message from the client computer to the server computer. The method includes sending a first data portion associated with the message from the client computer to the server computer. There is further included buffering the first data portion in a first memory space in a memory of the server computer.

If the message includes a second data portion, the method includes sending the second data portion from the client computer to the server computer. Additionally, the first memory space is written to a nonvolatile memory of the server computer, thereby permitting the first memory space to be unallocated. Furthermore, the second data portion is buffered in a second memory space in the memory of the server computer. The second memory space is larger than the first memory space.

In yet another embodiment, the invention relates to a computer readable media having program instructions stored therein. The instruction are configured for use in a computer network having a server computer coupled to a client computer. The client computer is configured to exchange a message with the server computer.

The computer readable media includes program instructions for receiving at the server computer a first data portion associated with the message from the client computer. There are further included program instructions for allocating a first memory space in a memory of the server computer for buffering the first data portion. There are additionally included program instructions for writing the first memory space to a nonvolatile memory of the server computer, thereby permitting the first memory space to be unallocated if a second data portion associated with the message is received at the server computer from the client computer. The second memory space being larger than the first memory space. Further more, there are included program instructions for allocating a second memory space in the memory of the server computer for buffering the second data portion if the second data portion associated with the message is received at the server computer from the client computer.

These and other advantages of the present invention will become apparent upon reading the following detailed descriptions and studying the various figures of the drawings.

BRIEF DESCRIPTION OF THE DRAWINGS

To facilitate discussion.

DETAILED DESCRIPTION OF THE PREFERRED EMBODIMENTS

Figure 1:
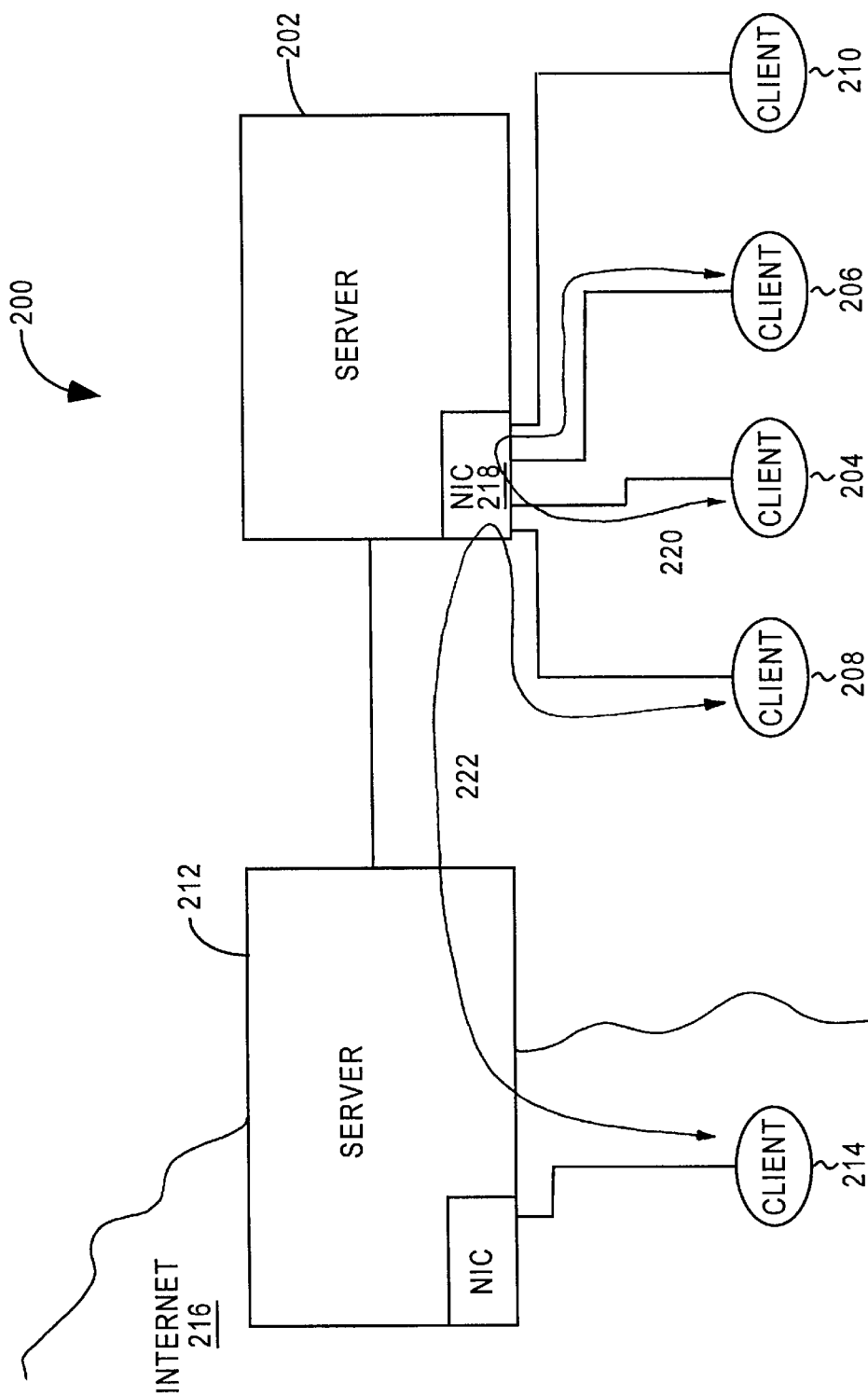
FIG. 1 illustrates a typical computer network, e.g., a local area network (LAN).

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

In accordance with one aspect of the present invention, there are provided inventive techniques for buffering data within the server computer from multiple network connections. It is observed that for some type of data, for example electronic mails (emails), the majority of the data streams communicated in the network are smaller than a given size. Fewer of the data streams involve large messages. In the email example, it is observed that the majority of users typically send fairly short messages, e.g., short reminders or questions. The percentage of the emails sent that include long files or long messages is observed to be relatively small.

With these observations, it is reasoned that if the data buffering scheme can be specifically tailored to the type of data sent, optimization in the use of the memory within the server computer and in the speed of the network connections may be achieved. In accordance with one aspect of the present invention, the memory space available for data buffering within the server computer is divided into two different areas. The first memory area is divided into a plurality of small buffer memory spaces, each of which is sufficiently large to buffer a smaller data stream in its entirety. A data stream smaller in size than the size of a small buffer memory space is preferably kept whole, i.e., undivided into multiple data portions, and buffered in its entirety within a small buffer memory space.

The second memory area is divided into a plurality of large buffer memory spaces, each of which is larger than a small buffer memory space. Data streams are always received first in a small buffer memory space. If a data stream is larger in size than the size of a small buffer memory space, it is received in multiple data portions. The first data portion is sized to fit within a small buffer memory space. The second data portion is sized to be larger than the first data portion of that data stream, and is received in a large buffer memory space. Once a large buffer memory space is employed to buffer a data stream, the first memory space previously employed to buffer the first data portion of that data stream is unallocated, thereby permitting that first memory space to be employed to service the data buffering needs of another network connection. Thereafter, only the large buffer memory space, which is larger than the small buffer memory space, is employed to buffer subsequently received data portions of that data stream.

Figure 3A:
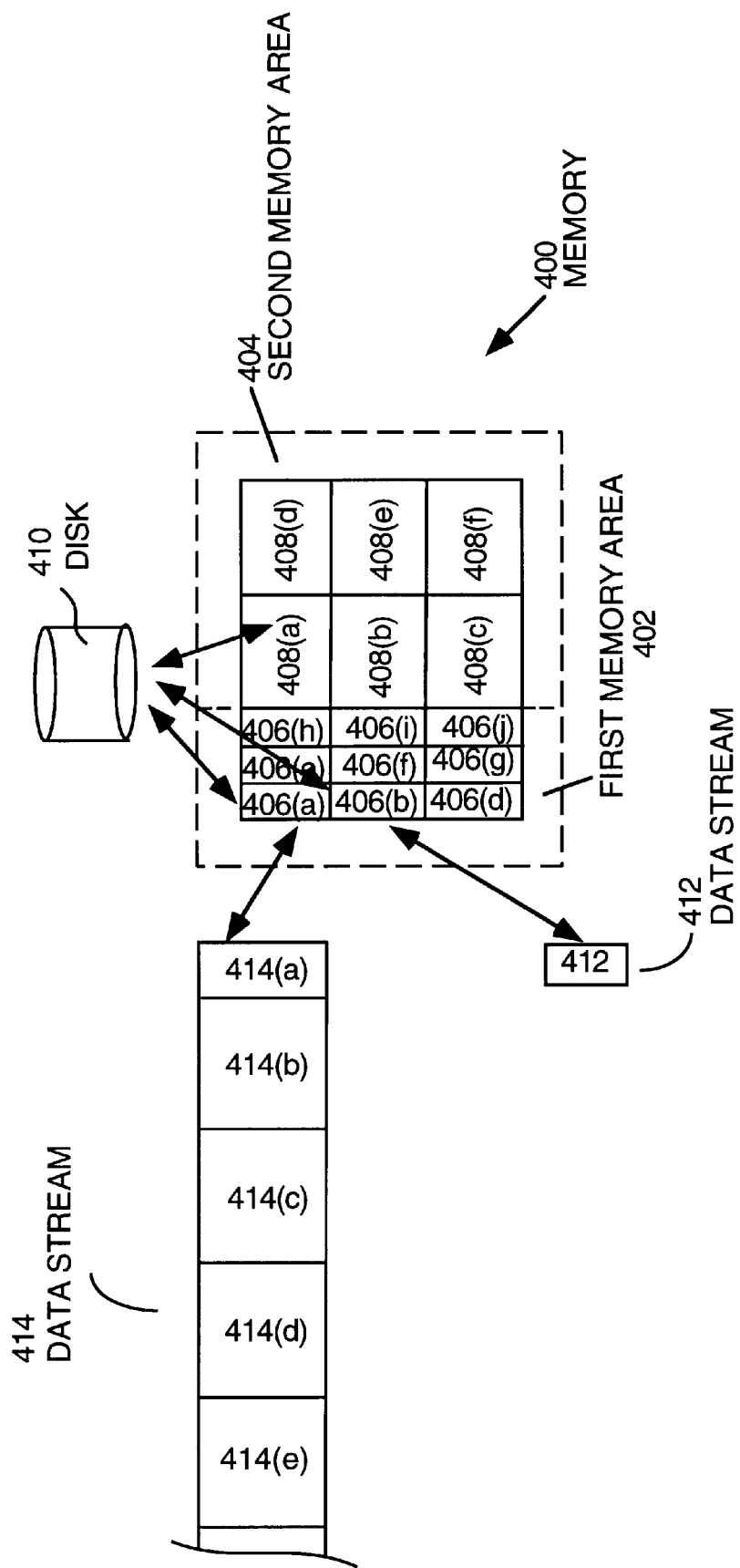
FIG. 3A shows the memory space within the server computer of a computer network, which has been arranged for buffering messages in accordance with one aspect of the present invention.

To further elaborate on the foregoing, FIG. 3A illustrates, in accordance with one embodiment of the present invention, a memory 400, representing the memory available for data buffering within the server computer. Memory 400 may be implemented using, for example, some type of random access memory such as dynamic random access memory (DRAM), static random access memory (SRAM), or the like. Memory 400 is divided into a first memory area 402 and a second memory area 404 to buffer data from the network connections which are serviced by the server computer. As shown in FIG. 3A, first memory area 402 is divided into nine small buffer memory spaces 406(a)–406(j). Second memory area 404 is divided into six large buffer memory spaces 408(a)–408(f). It should be noted that the numbers of small buffer memory spaces and large buffer memory spaces used herein are merely illustrative and may, of course, vary depending on, for example, the size of memory 400, and the respective sizes of each of the small buffer memory spaces and the large buffer memory spaces. In one embodiment, all small buffer memory spaces 406(a)–406(j) have substantially the same size, and all large buffer memory spaces 408(a)–408(f) have substantially the same size.

Figure 3B:
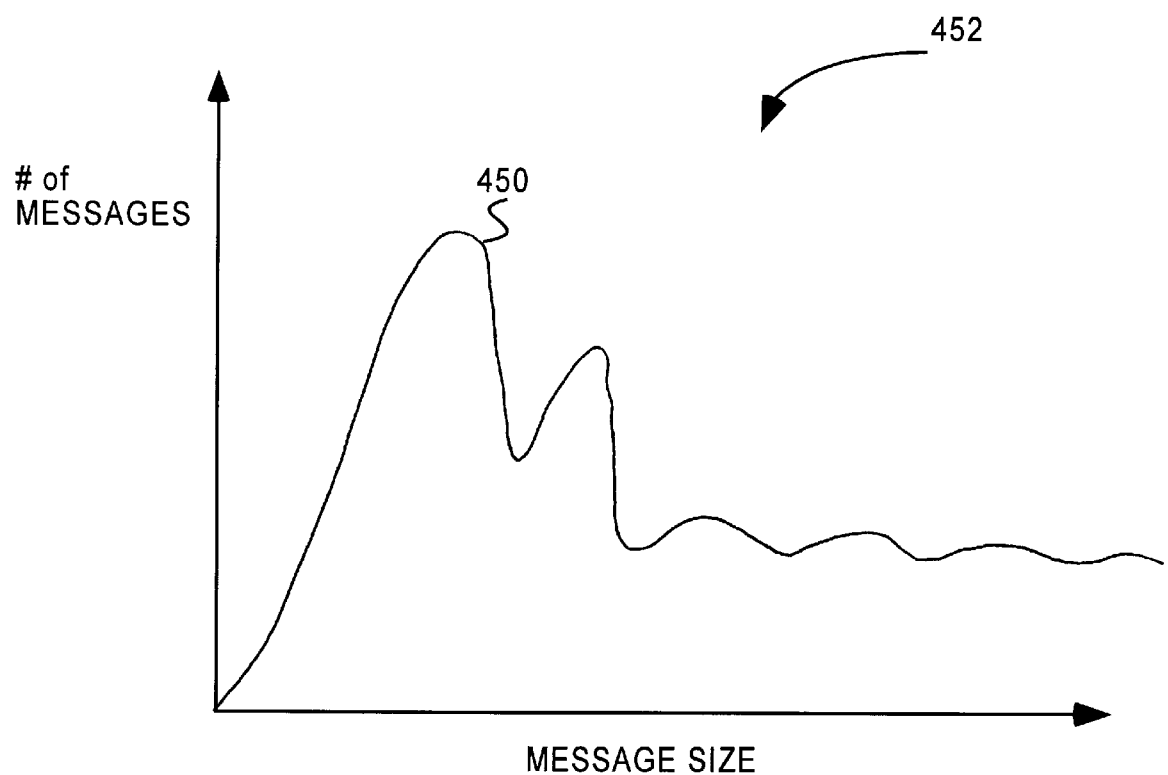
FIG. 3B illustrates a histogram employed to ascertain, in one embodiment, the size of the small buffer memory space and/or the size of the large buffer memory space for buffering the data portions of the data streams.

The size of each small buffer memory space is preferably tailored to the nature of the messages sent via the network connections. By way of example, the traffic over the network connections may be monitored for a period of time and plotted in a histogram, which plots the number of messages vs. the message size, to detect a peak suggesting that a large number of the messages communicated through the network connections is below a certain size. An exemplar peak 450 is illustrated for histogram 452 of FIG. 3B. The optimum size for the small buffer memory space may then be ascertained. In one embodiment, the size of each small buffer memory space may be sized larger than the message size at this peak, e.g., slightly larger up to about one standard deviation away from the peak or even larger, to ensure that most messages sent over the network connections would fit within a small buffer memory space. Of course the designer of the message system may subsequently adjust the size of the small buffer memory spaces to satisfy the desired tradeoff criteria between connection responsiveness, the number of network connections serviced, and the safety of the connection data. In an exemplar email system, a small buffer memory space size of about 4 Kilobytes works well.

Each large buffer memory space is preferably larger in size than each small buffer memory space. The optimum size for the large buffer memory space may be obtained by monitoring the network traffic. Again, the tradeoff between connection responsiveness, the number of network connections serviced, and the safety of the connection data should be kept in mind in determining the size of the large buffer memory space. The size of the large buffer memory space is, however, preferably sized to be substantial in order to minimize the frequency of writing to disk 410. In an exemplar email system, a large buffer memory space size of about 48 Kilobytes works well.

To facilitate discussion, data stream 412 of FIG. 3A and data stream 414 represent the data streams received from two different network connections. For illustration purposes, data stream 412 represents a data stream whose size is smaller than the size of each of small buffer memory spaces 406. Accordingly, data stream 412 may be buffered in its entirety within one of the small buffer memory spaces 406. In the example of FIG. 3A, data stream 412 is buffered within small buffer memory space 406(b).

Data stream 414 represents a data stream larger in size than the memory size of a smaller buffer memory space. Accordingly, data stream 414 must be divided into multiple data portions to be buffered within memory 400. Data stream 414, like data stream 412, is first buffered by one of small buffer memory spaces 406. In the example of FIG. 3A, data portion 414(a) is first received in small buffer memory space 406(a).

The second data portion 414(b) and subsequently received data portions, e.g., data portion 414(c), of data stream 414 are sized to fit within one of the large buffer memory spaces 408, e.g., large buffer memory 408(a) in the present example. In other words, the second data portion 414(b) of data stream 414 is larger than the first data portion 414(a) (which was received by small buffer memory space 406(a)). The first data portion 414(a) in small buffer memory space 406(*a*) may be written to disk 410 either before or after the second data portion 414(*b*) is received in large buffer memory space 408(*a*). Thereafter, small buffer memory space 406(*a*) may be unallocated to service the buffering needs of other network connections since only large buffer memory 408(*a*) is required to buffer subsequently received data portions of data stream 414.

Note that for data streams smaller than the size of a small buffer memory space 406, the inventive data buffering scheme advantageously eliminates the need to write to disk. Advantageously, the invention allows the use of a small memory space, which increases the number of simultaneous network connections, without unduly affecting the responsiveness of the connections buffered thereby. Additionally, little waste is involved when small buffer memory spaces are employed to buffer small data streams.

Also note that all data streams are initially assumed to be small and buffered initially with a small buffer memory space. If the data stream for a given network connection turns out to be larger than the small buffer memory space, i.e., it is divided into multiple data portions, the second and subsequent data portions are then buffered using the larger buffer memory space.

The use of the larger buffer memory space to buffer the second and subsequent data portions of the data stream minimizes disk access, thereby improving responsiveness. If the second and subsequent data portions of the larger data streams continued to be buffered by the small buffer memory space (as would be the case if all buffer memory spaces are of the same size, as was done in the prior art), more frequent disk accesses would have been necessary, which undesirably degrades network connection performance.

Note that the use of the inventive data buffering scheme advantageously permits a greater overall number of network connections to be serviced by a memory of a given size without substantially impacting network connection responsiveness. A greater number of network connections are accommodated by the smaller small buffer memory spaces. If a data stream turns out to be fairly large, the use of the larger buffer memory spaces still preserves responsiveness for that particular data stream while a greater number of smaller data streams can continue to be serviced by the smaller buffer memory spaces.

Figure 2:
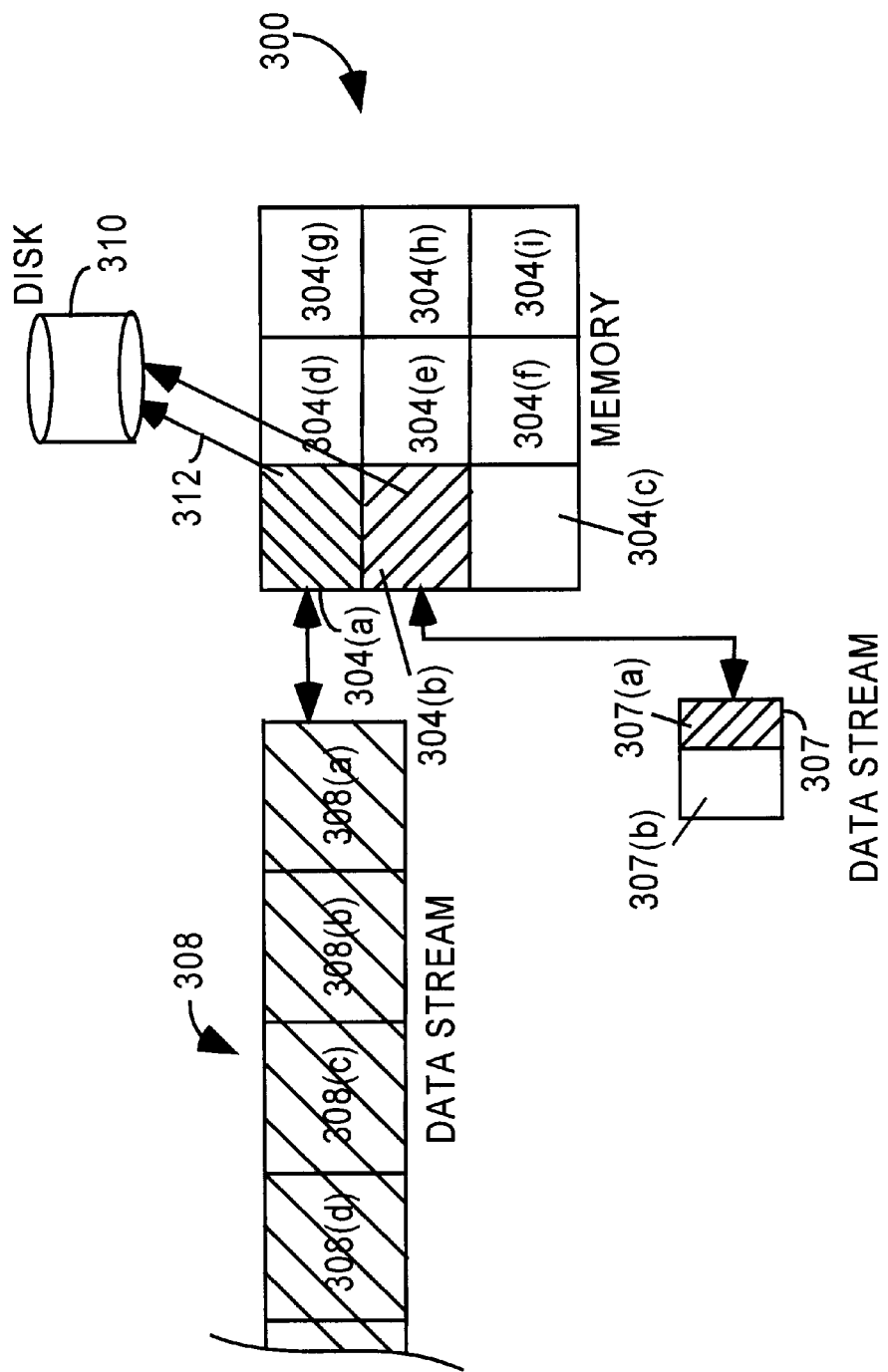
FIG. 2 shows the memory space within the server computer of a computer network, which has been arranged for buffering messages in accordance with a prior art technique.

By way of example, 4 Kilobytes of memory is allotted for each small buffer memory space and 48 Kilobytes of memory is allotted for each large buffer memory space in one implementation. When compared to prior art systems that allot a fixed amount of memory for each network connections, e.g., 12 Kilobytes, it is observed that a greater number of network connections may be serviced simultaneously without substantially affecting the responsiveness of the network connections. The same observation can be made when comparing the memory utilization of FIGS. 2 and 3A. In FIG. 2, only 9 network connections may be potentially served simultaneously. In FIG. 3A, up to 15 network connections may be simultaneously served by the combination of the small and large buffer memory spaces of memory 400.

Figure 4:
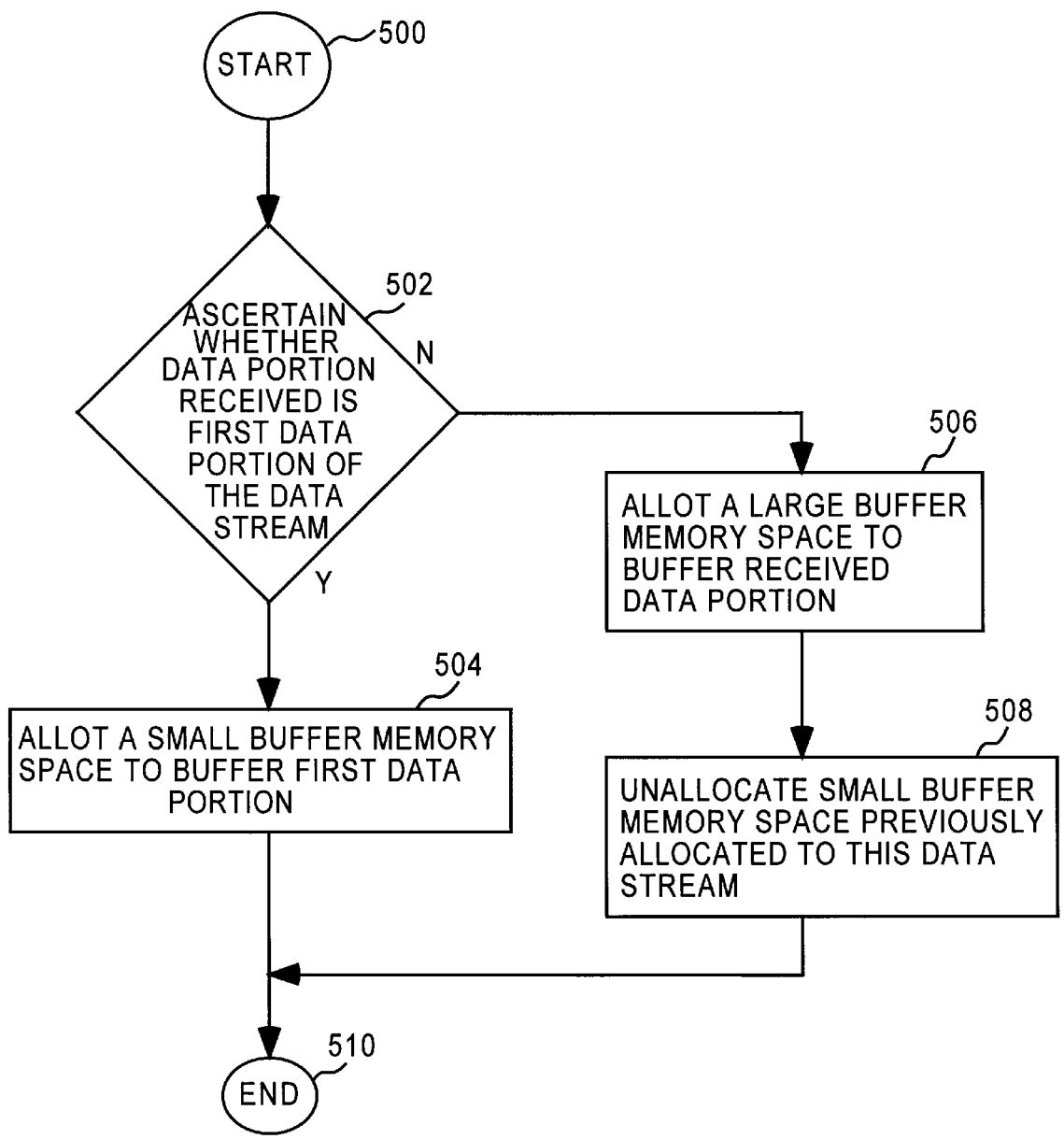
FIG. 4 is a flow chart illustrating, in accordance with one embodiment of the present invention, the steps of the inventive data buffering method.

FIG. 4 is a flow chart illustrating, in accordance with one embodiment of the present invention, the inventive data buffering method. Once a data stream is received, the method ascertains in step 502 whether the data portion received is the first data portion of this data stream. If the data portion received is the first data portion of the data stream, a small buffer memory space is employed to buffer the received data portion (as shown in step 504). If the data stream is smaller than the small buffer memory space, there is only one data portion representing entire data stream, i.e., the first data portion is the entire data stream.

If the data stream is larger than the small buffer memory space, it is divided into multiple data portions as discussed in connection with FIG. 3A, the first of which is buffered in one of the plurality of small buffer memory spaces as discussed in step 504. If the received data portion is not the first data portion of the data stream, i.e., a second data portion, the method allots, in step 506, a large buffer memory space larger than the small buffer memory space to buffer this received data portion. Of course the same large buffer memory space may be employed to buffer subsequently received data portions associated with this network connection without requiring a new allotment each time.

In step 508, the small buffer memory space previously employed to buffer the first data portion of this data stream is unallocated, if not already unallocated, to advantageously service other network connections. Once unallocated, there is no need to perform step 508 for subsequently received data portions of the same data stream since only the large buffer memory space is employed to buffer the subsequently received data portions of the data stream after the second data portion is received, and the data stream no longer employs a small buffer memory space for its data buffering needs. If another data portion of the same data stream is received subsequent to the receipt of the second data portion, the current content of the large buffer memory space may be written to disk to enable it to buffer these subsequently received data portions.

As mentioned earlier, the network traffic may be monitored for a period of time to ascertain the optimum sizes for the small buffer memory spaces and the large buffer memory spaces. In a particularly advantageous embodiment, the network traffic may be continuously monitored to dynamically change the sizes of the small buffer memory spaces and/or large buffer memory spaces. Of course, the data streams may also be divided correspondingly to permit the first data portion to be appropriately buffered in a small buffer memory space, and subsequently received data portions to be buffered in a large buffer memory space. For example, if it is observed that most of the traffic at a given time during the day comprises very small messages, the size of the small buffer memory spaces may be reduced to enable the server computer to service a greater number of network connections simultaneously.

Figure 5:
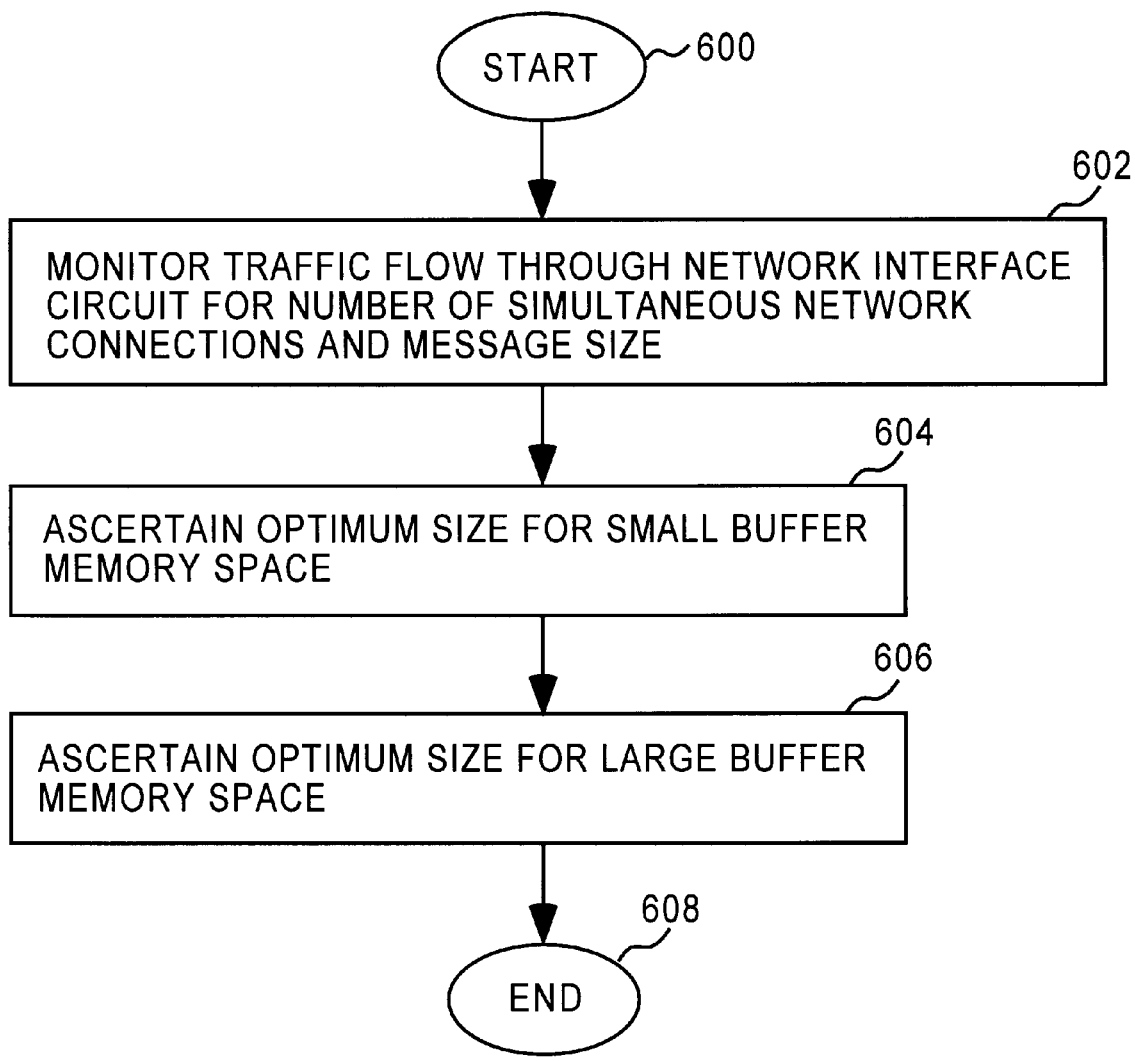
FIG. 5 is a flowchart illustrating, in accordance with one embodiment of the present invention, the steps involved in ascertaining the optimum sizes of the small buffer memory spaces and the large buffer memory spaces.

FIG. 5 is a flowchart illustrating, in accordance with one aspect of the present invention, the steps involved in ascertaining the optimum sizes of the small buffer memory spaces and the large buffer memory spaces. In step 602, the traffic flow through the network interface circuit, e.g., network interface circuit 218 of FIG. 1, is monitored for the message size, the number of messages, as well as the number of simultaneous network connections.

In step 604, the optimum size for the small buffer memory space is ascertained. As mentioned earlier, this optimum size may be ascertained by looking at the peaks in a histogram plot, such as that shown in FIG. 3B, of number of messages flowing through the network interface circuit versus their sizes. For example, if it is observed that the first peak occurs at about 3 Kilobytes, the optimum size may be defined to be slightly larger than this value, e.g., 4 Kilobytes, to ensure that most small messages can be buffered in their entireties in a small buffer memory space. If there are multiple peaks, the system designer can, by taking into account the desired tradeoff criteria between responsiveness, the number of simultaneous network connections, and the safety of the connection data, select one of the peaks for use in ascertaining the optimum small buffer memory space.

In step 606, the optimum size for the large buffer memory space is ascertained. The optimum size for the large buffer memory space should be ascertained after taking into account the average size of the messages, the available amount of memory available for the plurality of large buffer memory spaces, and the aforementioned tradeoff criteria.

The following arbitrary example illustrates the calculations involved, in one embodiment, in ascertaining the optimum size for the large buffer memory space. In this example, the optimum size for the small buffer memory space is 4 Kilobytes. Further, it is observed that there are, on average 30 simultaneous network connections of which 10 send, on average, messages of about 3 Megabytes each. The other 20 network connections send, on average, messages less than 4 Kilobytes in size.

If the total available system memory is 2 Megabytes, the amount of memory allocated to the plurality of small buffer memory spaces is 30×4 Kilobytes or 120 Kilobytes, or roughly 0.12 Megabytes. The amount of memory left to handle the 10 network connections that send the larger messages is 2 Megabytes—0.12 Megabytes, or roughly 1.88 Megabytes. The optimum size of the large buffer memory spaces is then 1/10 of 1.88 Megabytes (since there are 10 such network connections requiring the use of the large buffer memory spaces) or roughly 0.188 Megabytes. In reality, the size of each large buffer memory space may be made somewhat smaller to provide a safety margin as some of the available memory may be used up by the overhead.

Figure 6:
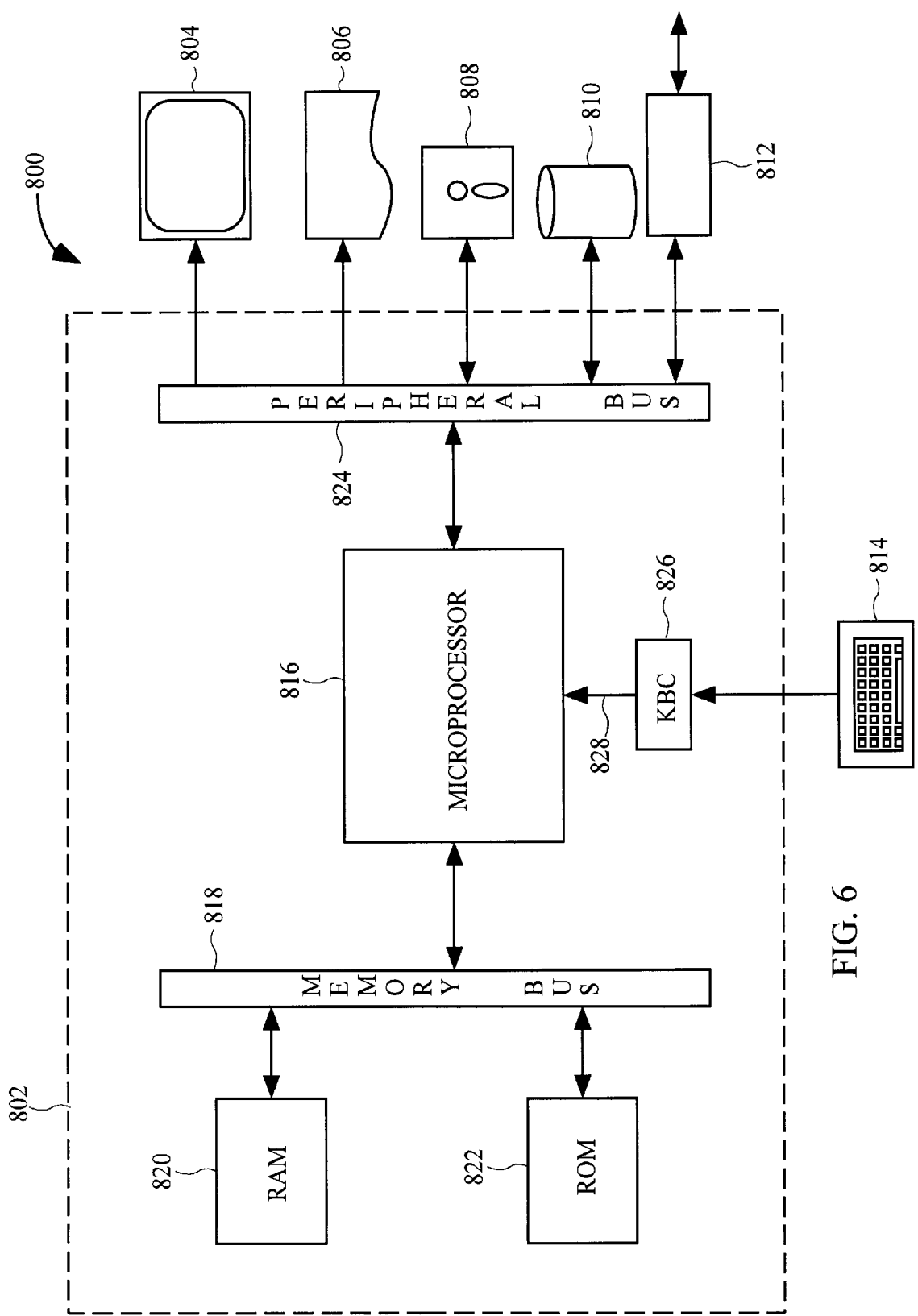
FIG. 6 is a block diagram of an exemplar computer system for carrying out the data buffering technique according to the invention.

FIG. 6 is a block diagram of an exemplar computer system 800 for carrying out the data buffering technique according to the invention. Computer system 800, or an analogous one, may be employed to implement either a client or a server of the a computer network. The computer system 800 includes a digital computer 802, a display screen (or monitor) 804, a printer 806, a floppy disk drive 808, a hard disk drive 810, a network interface 812, and a keyboard 814. The digital computer 802 includes a microprocessor 816, a memory bus 818, random access memory (RAM) 820, read only memory (ROM) 822, a peripheral bus 824, and a keyboard controller 826. The digital computer 802 can be a personal computer (such as an Apple computer, e.g., an Apple Macintosh, an IBM personal computer, or one of the compatibles thereof), a workstation computer (such as a Sun Microsystems or Hewlett-Packard workstation), or some other type of computer.

The microprocessor 816 is a general purpose digital processor which controls the operation of the computer system 800. The microprocessor 816 can be a single-chip processor or can be implemented with multiple components. Using instructions retrieved from memory, the microprocessor 816 controls the reception and manipulation of input data and the output and display of data on output devices. According to the invention, a particular function of microprocessor 816 is to ascertain the optimum sizes of the small buffer memory spaces and the large buffer memory spaces, as well as facilitate communication in the network. In one embodiment, microprocessor 816 may be employed to divide the data streams into data portions as well.

The memory bus 818 is used by the microprocessor 816 to access the RAM 820 and the ROM 822. The RAM 820 is used by the microprocessor 816 as a general storage area and as scratch-pad memory, and can also be used to store input data and processed data. The ROM 822 can be used to store instructions or program code followed by the microprocessor 816 as well as other data.

The peripheral bus 824 is used to access the input, output, and storage devices used by the digital computer 802. In the described embodiment, these devices include the display screen 804, the printer device 806, the floppy disk drive 808, the hard disk drive 810, and the network interface 812. The keyboard controller 826 is used to receive input from keyboard 814 and send decoded symbols for each pressed key to microprocessor 816 over bus 828.

The display screen 804 is an output device that displays images of data provided by the microprocessor 816 via the peripheral bus 824 or provided by other components in the computer system 800. The printer device 806 when operating as a printer provides an image on a sheet of paper or a similar surface. Other output devices such as a plotter, typesetter, etc. can be used in place of, or in addition to, the printer device 806.

The floppy disk drive 808 and the hard disk drive 810 can be used to store various types of data. The floppy disk drive 808 facilitates transporting such data to other computer systems, and hard disk drive 810 permits fast access to large amounts of stored data.

The microprocessor 816 together with an operating system operate to execute computer code and produce and use data. The computer code and data may reside on the RAM 820, the ROM 822, or the hard disk drive 820. The computer code and data could also reside on a removable program medium and loaded or installed onto the computer system 800 when needed. Removable program mediums include, for example, CD-ROM, PC-CARD, floppy disk and magnetic tape.

The network interface circuit 812 is used to send and receive data over a network connected to other computer systems. An interface card or similar device and appropriate software implemented by the microprocessor 816 can be used to connect the computer system 800 to an existing network and transfer data according to standard protocols.

The keyboard 814 is used by a user to input commands and other instructions to the computer system 800. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer network having a server computer coupled to a client computer, a method of exchanging a message from said client computer to said server computer, comprising:

monitoring message flow through said server computer;

determining an optimum size for a first memory space responsive to said monitoring, said optimum size for said first memory space representing a smallest memory size that permits each of a predefined percentage of said message flow through said server computer to be buffered undivided in said first memory space;

sizing said first memory space responsive to said optimum size;

receiving at said server computer a first data portion associated with said message from said client computer;

allocating said first memory space in a memory of said server computer for buffering said first data portion; and if a second data portion associated with said message is received at said server computer from said client computer,
 writing said first memory space to a nonvolatile memory of said server computer, thereby permitting said first memory space to be unallocated, and
 allocating a second memory space in said memory of said server computer for buffering said second data portion, said second memory space being larger than said first memory space.

2. The method of claim 1 wherein said message represents an email message.

3. The method of claim 1 wherein said message represents a data record.

4. The method of claim 1 wherein said monitoring is continuous, thereby permitting said sizing to be performed in a dynamic manner.

5. The method of claim 1 wherein said monitoring is performed with a histogram plot, said histogram plot tracking the size of messages exchanged via said server computer.

6. The method of claim 1 further comprising:
 determining an optimal size for said second memory space responsive to said monitoring; and
 sizing said second memory space responsive to said optimum size.

7. In a computer network having a server computer coupled to a client computer, a method of exchanging a message from said client computer to said server computer, comprising:

continuously monitoring message flow through said server computer;

dynamically determining a first buffer size for first buffers provided in a first memory area responsive to said monitoring, said first buffer size provided in said first memory area represents a smallest memory size that permits each of predefined percentage of said message flow through said server computer to be buffered undivided in said first memory area;

establishing said first buffers of said first buffer size in said first memory area and second buffers of a second buffer size in a second memory area, the second buffer size being greater than the first buffer size;

sending a first data portion associated with said message from said client computer to said server computer;

buffering said first data portion in one of said first buffers of said first buffer size in said first memory area in a memory of said server computer; and if said message includes a second data portion, sending said second data portion from said client computer to said server computer, buffering said second data portion in one of said second buffers of said second buffer size in said second memory area in said memory of said server computer.

8. The method of claim 7 wherein said message represents an email message.

9. A computer readable media having program instructions stored therein, said instructions being configured for use in a computer network having a server computer coupled to a client computer, said client computer being configured to exchange a message with said server computer, said computer readable media comprising:

program instructions for continuously monitoring message flow through said server computer;

program instructions for dynamically determining a first buffer size for first buffers provided in a first memory area responsive to said monitoring, said first buffer size provided in said first memory area represents a smallest memory size that permits each of a predefined percentage of said message flow through said server computer to be buffered undivided in said first memory area;

program instructions for establishing said first buffers of said first buffer size in said first memory area and for establishing second buffers of a second buffer size in a second memory area, the second buffer size being greater than the first buffer size;

program instructions for receiving at said server computer a first data portion associated with said message from said client computer;

program instructions for allocating one of the first buffers of said first memory area in a memory of said server computer for buffering said first data portion; and if a second data portion associated with said message is received at said server computer from said client computer, program instructions for allocating one of the second buffers of said second memory area in said memory of said server computer for buffering said second data portion.

10. The computer readable media of claim 9 wherein said message represents an email message.

11. The computer readable media of claim 9 wherein said monitoring is performed with a histogram plot, said histogram plot tracking the size of messages exchanged via said server computer.

12. The computer readable media of claim 9 further comprising:
 program instructions for determining the second buffer size for the second buffers provided in the second first memory area responsive to said monitoring.

13. The computer readable media of claim 9 wherein said message represents a data record.

14. In a computer network having a server computer coupled to a client computer, an apparatus for exchanging a message from said client computer to said server computer, comprising:

means for monitoring message flow through said server computer;

means for determining an optimum size for said first memory space responsive to said monitoring, said optimum size for said first memory space representing a smallest memory size that permits each of a predefined percentage of said message flow through said server computer to be buffered undivided in said first memory space;

means for sizing said first memory space responsive to said optimum size;

means for receiving at said server computer a first data portion associated with said message from said client computer;

means for allocating a first memory space in a memory of said server computer for buffering said first data portion;

means for writing said first memory space to a nonvolatile memory of said server computer, thereby permitting said first memory space to be unallocated if a second data portion associated with said message is received at said server computer from said client computer; and means for allocating a second memory space in said memory of said server computer for buffering said second data portion, said second memory space being larger than said first memory space if said second data portion associated with said message is received at said server computer from said client computer.

15. The apparatus of claim 14 wherein said message represents an email message.

* * * * *

UNITED STATES PATENT AND TRADEMARK OFFICE
CERTIFICATE OF CORRECTION

| | |
|---|---|
| PATENT NO. | : 6,014,727 |
| DATED | : January 11, 2000 |
| INVENTOR(S) | : David Z. Creemer |

Page 1 of 1

It is certified that error appears in the above-identified patent and that said Letters Patent is hereby corrected as shown below:

Column 11,
Line 56, "each of predefined" should be -- each of a predefined --.

Signed and Sealed this

Sixteenth Day of October, 2001

Attest:

*Nicholas P. Godici*

NICHOLAS P. GODICI
*Attesting Officer*     *Acting Director of the United States Patent and Trademark Office*